(12) United States Patent
Berger

(10) Patent No.: US 6,600,312 B1
(45) Date of Patent: Jul. 29, 2003

(54) METHOD AND APPARATUS FOR INDEXING HARD DISKS BY USING A SCANNING PROBE

(75) Inventor: Ruediger Friedrich Berger, Heidesheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/005,946

(22) Filed: Dec. 4, 2001

(30) Foreign Application Priority Data

Jan. 13, 2001 (EP) .............................. 01100791

(51) Int. Cl.[7] ............................................. G01R 33/12
(52) U.S. Cl. ....................................................... 324/212
(58) Field of Search ........................... 324/212; 360/31, 360/78.13, 75, 135; 369/275.3, 98

(56) References Cited

U.S. PATENT DOCUMENTS 4,087,842 A * 5/1978 Manly ..................... 360/77.06
4,417,289 A * 11/1983 Ragle et al. ............. 360/98.03
4,870,514 A * 9/1989 Enami et al. .................. 360/61
4,992,893 A * 2/1991 Kanai et al. ............. 360/78.13
5,297,131 A * 3/1994 Tanaka ..................... 369/275.2
5,930,066 A * 7/1999 Ishizuka et al. .......... 360/77.03

* cited by examiner

*Primary Examiner*—Edward Lefkowitz
*Assistant Examiner*—Reena Aurora
(74) *Attorney, Agent, or Firm*—Robert B. Martin; Bracewell & Patterson, L.L.P.

(57) ABSTRACT

A method for indexing hard disks by using a scanning probe is disclosed. A hard disk includes several essentially concentric magnetic tracks. A scanning probe is initially positioned at a first point located on a magnetic track to mark the first point as a first radial position index. Then, the scanning probe is positioned at a second point located on the magnetic track to mark the second point as a second radial position index. Next, the scanning probe is positioned at a third point located on the magnetic track to mark the third point as a third radial position index. A rotational center of a co-ordinate system is subsequently calculated according to the three radial position indexes. Finally, the co-ordinate system having the rotational center is utilized as a precise indexing system.

17 Claims, 4 Drawing Sheets

METHOD AND APPARATUS FOR INDEXING HARD DISKS BY USING A SCANNING PROBE

RELATED PATENT APPLICATION

The present patent application claims priority from a German application Application No. 01100791.1, filed on Jan. 13, 2001.

BACKGROUND OF THE INVENTION

1. Technical Field

The present invention relates to direct access storage devices in general, and in particular to magnetic and optical storage devices. Still more particularly, the present invention relates to a method and apparatus for indexing hard disks by means of a scanning probe.

2. Description of Related Art

Severe performance problems on magnetic storage media may be caused by mechanical/magnetic defects, thickness variations of layering sequence or variations in magnetic coupling in or on top of the magnetic layers in the nanometer range of the magnetic storage media. Hence, certain techniques that enable the mapping of surface and magnetic properties of those critical areas (or areas of interest) with a very high spatial resolution are required. In addition, those techniques should be applicable in-situ in order to detect and characterize the cause of failures. Furthermore, those techniques should be incorporated within a test routine that allows critical areas to be characterized in a relatively short time frame.

One prior art approach for imaging hard disk defects is by characterizing a hard disk on a spin stand (SPST). With such approach, the magnetic and/or topographic properties of a spinning hard disk is analyzed by using test heads such as read write heads that are commonly used in hard disk drives. Some test heads may be specifically designed for test procedures that feature higher resolution, bandwidth, or cover larger tested areas. Defects on a nanometer scale detected by an SPST analysis can be mapped by a scanning probe microscope that is attached separately to the SPST. For even higher accuracy, the common co-ordinate system given by a rotating spindle on which the storage media are mounted can be used. One requirement for such test technique is that the storage media is stationary during both the writing process and the positioning process. Otherwise, the common co-ordinate system between the two measuring schemes will be lost. In other words, any deviation between the center of rotation and the center of the circular data tracks cannot be tolerated. Sometimes, such deviations may even be caused by removing a disk from the spindle and then placing the same disk back on the spindle again. Consequently, data or servo information in the storage media have to be deleted or overwritten by the test mechanism.

However, it is often not very convenient to overwrite additional magnetic information to hard disks because that would change the existing magnetic domains (or magnetic transitions) in the hard disk that might be the cause of performance problems. Another drawback of the above-mentioned overwriting approach is that, in some cases, failures of the magnetic media or magnetic failures can only be detected in a hard disk drive after a servo pattern has been written. Therefore, a nanometer level precision analysis of magnetic media as they come from the hard disk drive are very desirable. A mechanism or tool that is capable of using the existing magnetic transitions, such as the tracks of servo pattern, for exact positioning of the scanning probe is also very desirable.

Another prior art approach relies on magnetic marking techniques and detection of marked areas under an optical microscope. A typical magnetic marking technique is by using a ferrofluidic liquid that is brought on top of the magnetic media. Disadvantages of such approach include additional optical devices and many different analyzing steps are required and time consuming. In addition, not all defects can be found under an optical microscope, especially when no marking techniques are available. Furthermore, ferrofluidic liquid is often destructive to magnetic storage media.

Consequently, it would be desirable to provide an improved method and apparatus for indexing data storage media.

SUMMARY OF THE INVENTION

In accordance with a preferred embodiment of the present invention, a hard disk includes several essentially concentric magnetic tracks. A scanning probe is initially positioned at a first point located on a magnetic track to mark the first point as a first radial position index. Then, the scanning probe is positioned at a second point located on the magnetic track to mark the second point as a second radial position index. Next, the scanning probe is positioned at a third point located on the magnetic track to mark the third point as a third radial position index. A rotational center of a co-ordinate system is subsequently calculated according to the three radial position indexes. Finally, the coordinate system having the rotational center is utilized as a precise indexing system.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
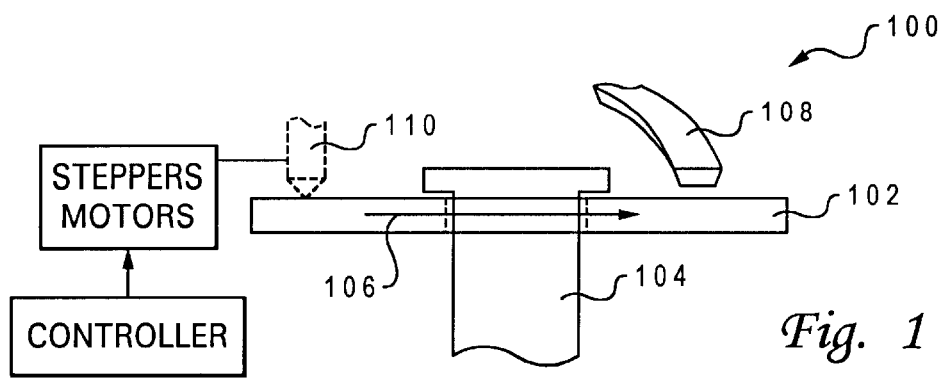
FIG. 1 is a diagram of a spin stand on which a preferred embodiment of the present invention can be used.

Referring now to the drawings and in particular to FIG. 1, there is depicted a diagram of a spin stand (SPST) on which a preferred embodiment of the present invention can be used. As shown, a magnetic disk 102 is rigidly mounted on a rotating shaft (or spindle) 104 of a SPST 100. Magnetic disk 102 is shown to spin in the direction of arrow 106. SPST 100 also includes a read/write head (RWH) or glide head 108 mounted over magnetic disk 102. The distance between RWH 108 and magnetic disk 102 is in the order of several nanometers. RWH 108 is used to detect specific areas of interest of magnetic disk 102, which includes mechanic lesions of the disk surface or magnetic defects of magnetic layer(s) deposited on top of magnetic disk 102. Those defects can be detected by their disturbation of the magnetic bit information stored on magnetic disk 102. The defects often cause failure to the entire magnetic disk 102, in particular when coinciding with a track of a servo pattern that is required for disk operation of magnetic disk 102 within a hard disk drive.

A scanning probe microscope (SPM) 110, which is indicated by dotted lines, may be attached to SPST 100. SPM 110 is used to map defects that have already been detected and localized by the above-described SPST analysis. The technique of the above-described SPST analysis uses index signals of spindle 104 and partially a magnetic index being written by SPST 100 on magnetic disk 102, which allows for high accuracy of the mapping.

Figure 2:
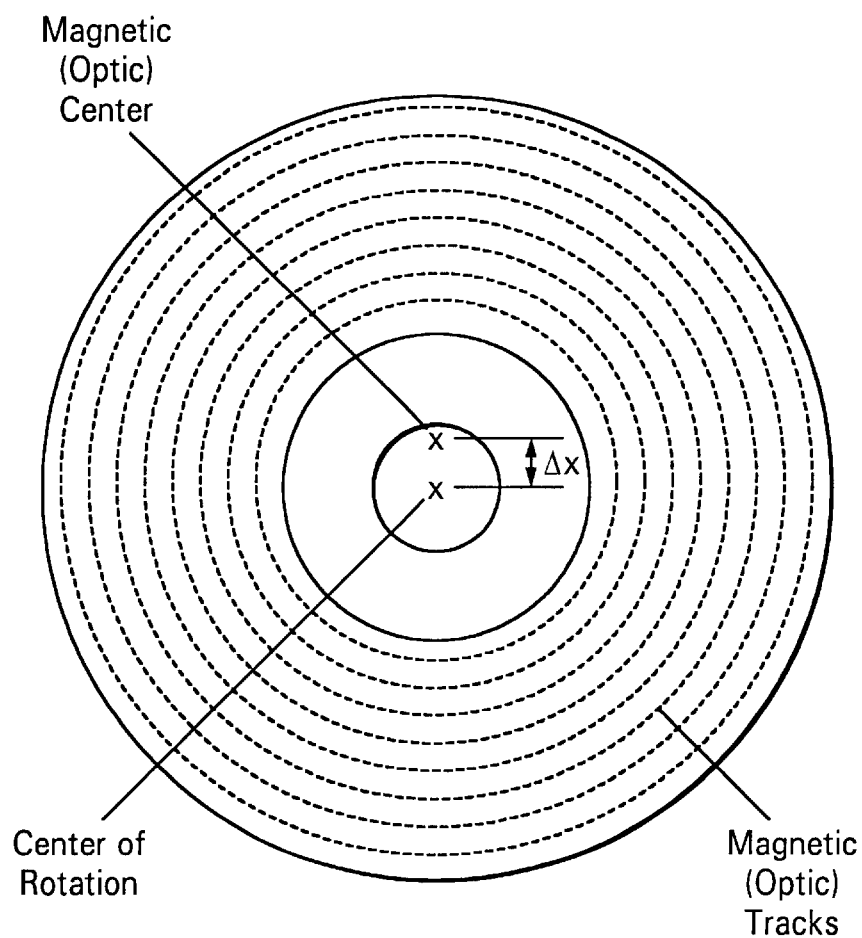
FIG. 2 is an example of eccentric correction of a magnetic or optic disk, in accordance with a preferred embodiment of the present invention.

With reference now to FIG. 2, there is depicted an example of eccentric correction of a magnetic or optic disk, in accordance with a preferred embodiment of the present invention. It is hereby assumed that the magnetic center of the underlying essentially concentric tracks differs from the geometrical center of the magnetic media by a small linear shift x. It should be noted that, in most cases, the geometrical center deviates from the center of the underlying data tracks when a storage media is mounted to a spindle as described above. Thus, by determining the magnetic center of rotation (or tracks) according to the method described infra, the linear shift can be calculated precisely to enable a proper correction, such as a static shift of the disk or by a dynamic or static actuation of a suspension of a hard disk drive.

Figure 3A:
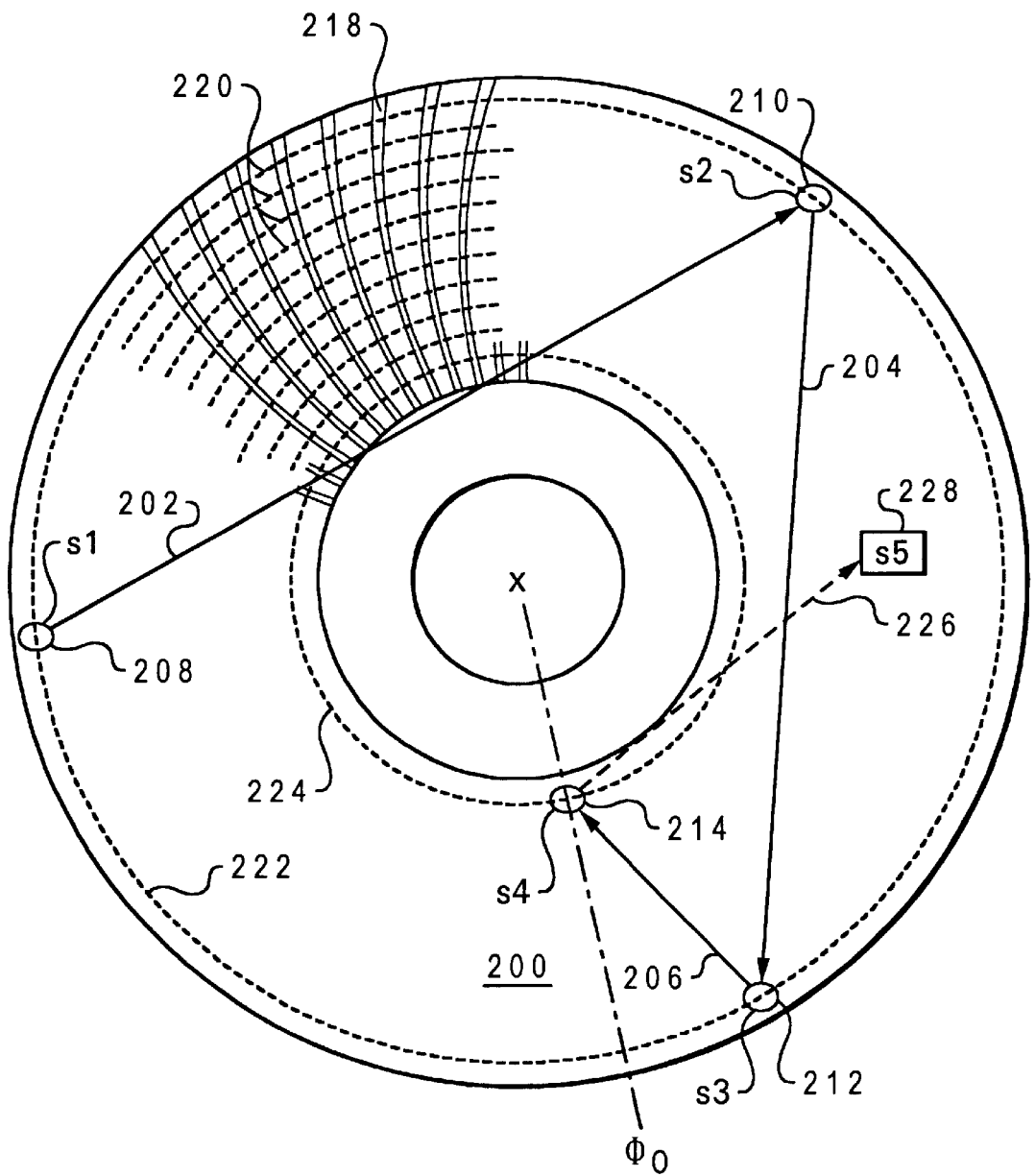
FIGS. 3a–3c are different embodiments for providing a rotational coordinate system on a disk surface, in accordance with a preferred embodiment of the present invention.
Figure 3B:
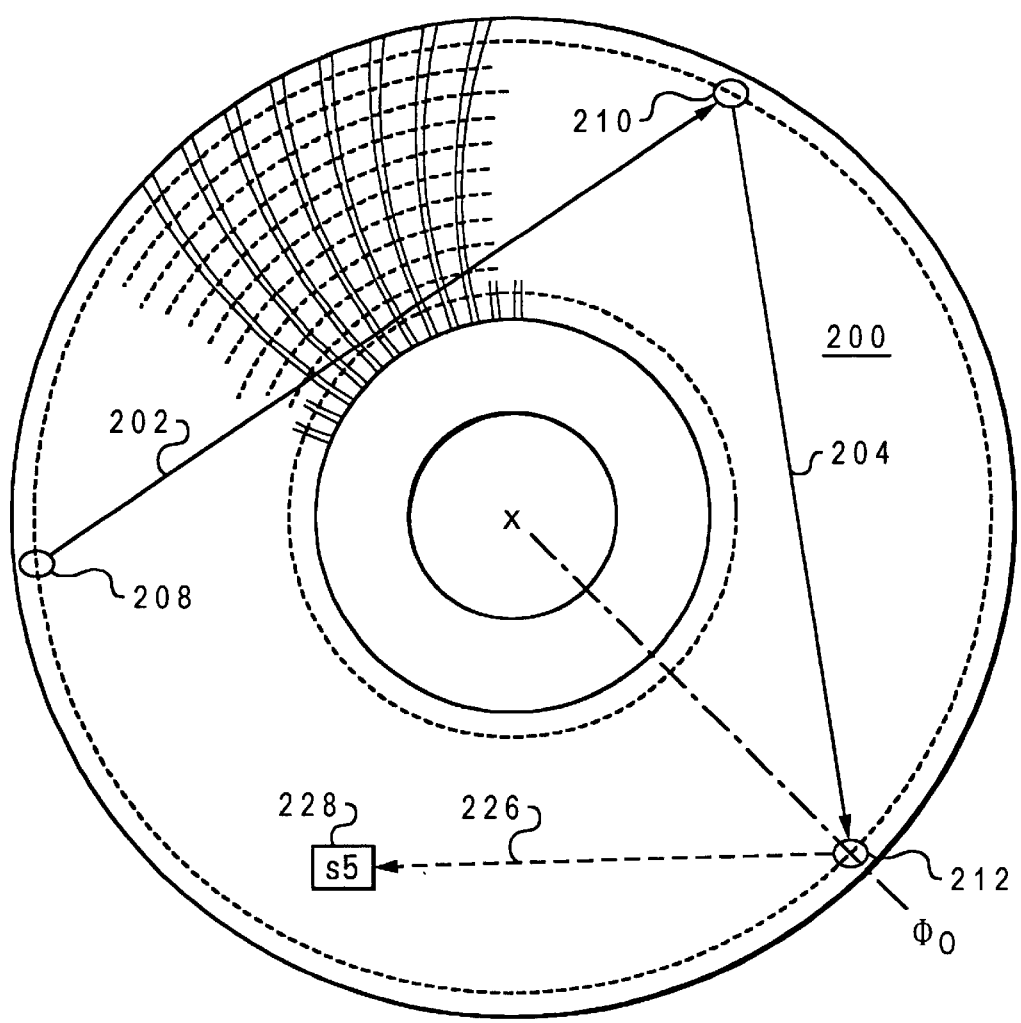
Figure 3C:
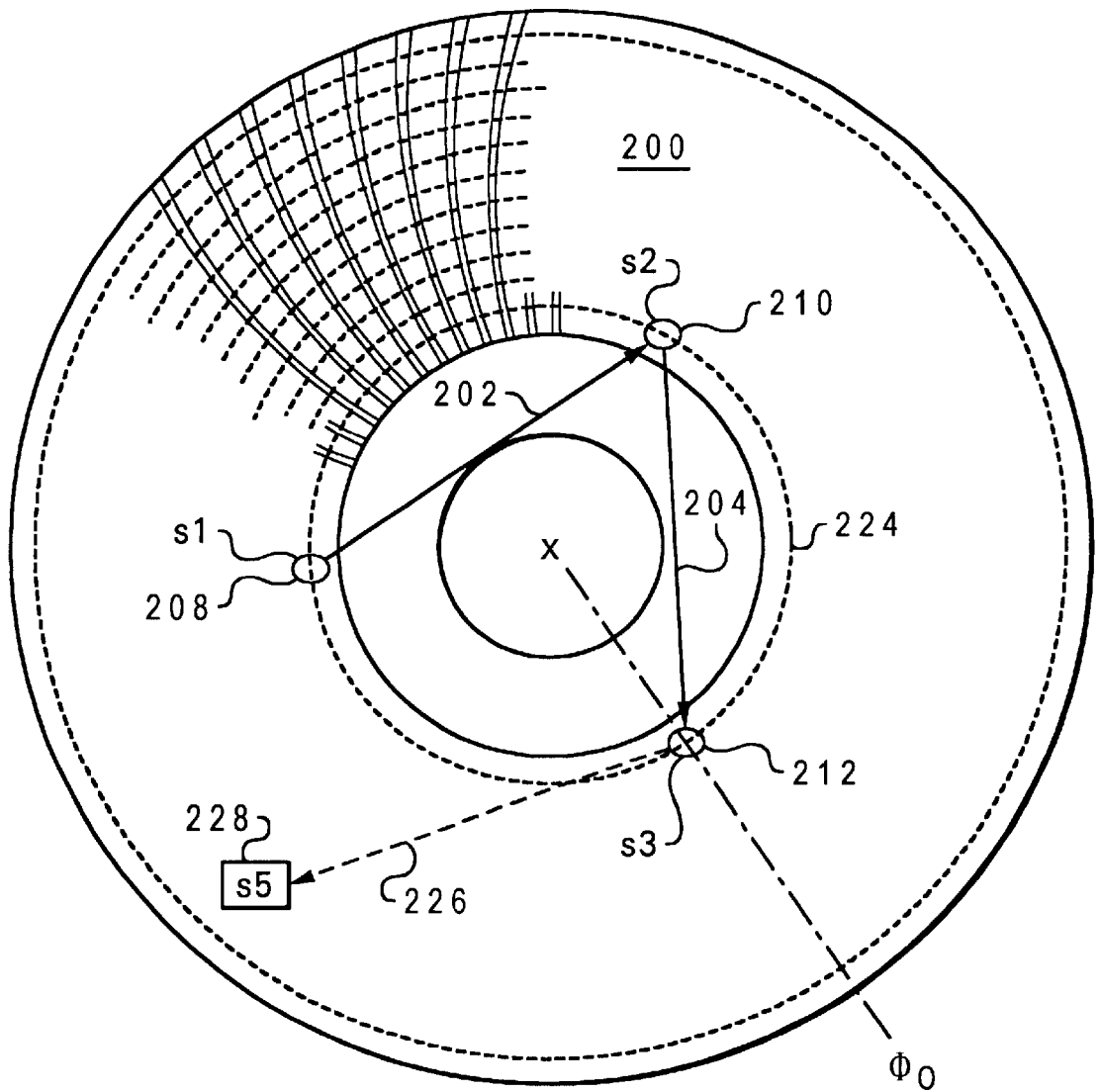

Referring now to FIGS. 3a–3c, there are illustrated different embodiments for providing a rotational co-ordinate system on a disk surface, in accordance with a preferred embodiment of the present invention. The underlying procedure is illustrated by three different top views of a disk 200 in FIGS. 3a–3c, respectively. The following assumptions apply to FIGS. 3a–3c. First, it is assumed that the co-ordinate system is defined by positioning a scanning probe on top of a disk surface along certain paths that are depicted by solid lines 202, 204 and 206, and the associated path nodes (or points), such as 208, 210 and 212, are determined by using two underlying stepper motors (not shown) to provide corresponding position information. Second, it is assumed that disk 200 already includes a magnetic or optic pattern. In the present example, a servo pattern includes essentially concentric tracks 220 having smaller (circle) segments for storing servo information and wider circle segments 218 for storing data.

In the first embodiment depicted in FIG. 3a, the scanning probe is initially positioned on an arbitrary point S1 208 located on an outer track 222 of concentric tracks 220. The detection of outer track 222 can be accomplished by checking the asymmetric neighborhood of outer track 222, i.e., outer track 222 has an adjacent inner track but no adjacent outside track.

Then, the scanning probe is moved along path 202 and positioned again at a second point S2 210 also located on outer track 222. Subsequently, the scanning probe is moved from second point S2 210 to a third point S3 212 located on outer track 222. From the three scan points 208, 210 and 212, the magnetic center of data tracks corresponding to the center of rotation during magnetic information are being written can be calculated using common curve-fitting algorithms that are well-known in the art.

Afterwards, the scanning probe is moved from third point S3 212 to a fourth point S4 214 located anywhere between the most inner track 224 and the most outer possible track 222 of concentric tracks 220. Using fourth point S4 214, a zero-angle position $\Phi_0$ of the cylindric co-ordinate system is defined. The zero-angle can be defined by local data transitions. There are no transitions written at $\Phi_0 \pm \Delta\Phi$. Such a $\Phi_0$ can also be obtained by data transitions vice versa.

It should be noted that fourth point S4 214 is only optional for defining the zero-angle position since the zero-angle position can be also defined using one of the other points S1–S3. Using the previously calculated center of rotation and the defined zero-angle position, the cylindric or rotational co-ordinate system can be well-defined.

At each of points S1–S4 (i.e., 208, 210, 212 and 214), instead of using the position information of the above-mentioned stepper motors, an index can be written to magnetic layer or into the disk surface; thus, enabling the reuse of the defined co-ordinate system on a different test stand or the like. Such indexes can be written by magnetic techniques or by surface modification techniques such as laser melting or scratching. These indexes can also be used for optical or magneto-optical data storage media.

Using the defined co-ordinate system, any position on magnetic disk 200, such as a point S5 at an area of interest 228, can be characterized. Generally speaking, such technique is independent of specific parameters of the underlying media such as disk size, thickness or read/write head geometry, flying height, the fixture design to which the read/write head is mounted and any other specific hardware, electronics (channel) or software requirements and the pre-characterization tool.

The second embodiment shown in FIG. 3b distinguishes from the first embodiment from FIG. 3a insofar as comprising only three points S1, S2 and S3 (i.e., 208, 210 and 212) and point S3 is also used to defined the zero-angle required for the cylindric co-ordinate system. Thus, after having indexed point S3 212, magnetic disk 200 is ready to be probed by additional scans such as point S5 at a defect area 228, which is indicated again by dotted lines 226.

The third embodiment shown in FIG. 3c distinguishes from the first and second embodiments from FIGS. 2a and 2b insofar as the points S1–S3 are not located on most outer track 222 of concentric tracks 220 but on inner track 224. Using inner track 224, instead of outer track 222, has the disadvantage that the co-ordinate system, in particular the center of rotation, cannot be defined as accurately as in the above-mentioned two examples. But, it can be advantageous in cases where the outer track cannot be written into for indexing purposes.

As has been described, the present invention provides a method for indexing a hard disk by means of a scanning probe. The method of the present invention can be implemented in a scanning probe microscope or a corresponding device having a x-y stage for sample or scan head positioning. It is emphasized that the magnetic disk, in contrast to the prior art approaches, must only be fixed on a sample holder when the scanning probe is positioned on the disk surface only by means of two stepper motors, one for the x-directions and the other for the y-directions.

While the invention has been particularly shown and described with reference to a preferred embodiment, it will be understood by those skilled in the art that various changes in form and detail may be made therein without departing from the spirit and scope of the invention.

What is claimed is:

1. A method for indexing a hard disk by means of a scanning probe, wherein said hard disk includes a plurality of essentially concentric magnetic tracks, said method comprising:

positioning a scanning probe at a first point located on a magnetic track to mark said first point as a first radial position index;

positioning said scanning probe at a second point located on said magnetic track to mark said second point as a second radial position index;

positioning said scanning probe at a third point located on said magnetic track to mark said third point as a third radial position index;

calculating a rotational center of a rotational co-ordinate system according to said three radial position indexes; and using said rotational co-ordinate system having said rotational center as a precise indexing system.

2. The method of claim 1, wherein said method further includes marking one of said three indexes as a zero-angle position index.

3. The method of claim 1, wherein said method further includes positioning said scanning probe at a fourth point located at any magnetic track on said hard disk to mark said fourth point as a zero-angle position index; and defining a second rotational center of a second rotational co-ordinate system according to said four radial position indexes.

4. The method of claim 1, wherein said method further includes using a servo pattern as position information for defining said rotational center of said rotational co-ordinate system.

5. The method of claim 1, wherein said method further includes writing magnetic bits or laser bumps at said radial position indexes.

6. The method of claim 1, wherein said method further includes using a scanning probe microscope for finding areas of interest on said hard disk using said rotational center of said rotational co-ordinate system.

7. An apparatus for indexing a hard disk via a scanning probe, wherein said hard disk includes a plurality of essentially concentric magnetic tracks, said apparatus comprising:

means for positioning a scanning probe at a first point located on a magnetic track to mark said first point as a first radial position index, for positioning said scanning probe at a second point located on said magnetic track to mark said second point as a second radial position index, and for positioning said scanning probe at a third point located on said magnetic track to mark said third point as a third radial position index;

means for calculating a rotational center of a rotational co-ordinate system according to said three radial position indexes; and means for using said rotational co-ordinate system having said rotational center as a precise indexing system.

8. The apparatus of claim 7, wherein said apparatus further includes a means for marking one of said three indexes as a zero-angle position index.

9. The apparatus of claim 7, wherein said positioning means further includes means for positioning said scanning probe at a fourth point located at any magnetic track on said hard disk to mark said fourth point as a zero-angle position index; and means for defining a second rotational center of a second rotational co-ordinate system according to said four radial position indexes.

10. The apparatus of claim 7, wherein said apparatus further includes means for using a servo pattern as position information for defining said rotational center of said rotational co-ordinate system.

11. The apparatus of claim 7, wherein said apparatus further includes means for writing magnetic bits or laser bumps at said radial position indexes.

12. The apparatus of claim 7, wherein said apparatus further includes means for finding areas of interest on said hard disk using said rotational center of said rotational co-ordinate system.

13. An apparatus for indexing a magnetic hard disk via a scanning probe, wherein said hard disk includes an essentially concentric magnetic track-oriented pattern, said apparatus comprising:

means for positioning said scanning probe at three consecutive points located on an magnetic outer track of said hard disk;

means for marking said three consecutive points as corresponding radial position indexes;

means for marking one of said three radial position indexes as a zero-angle position index; and means for calculating a rotational co-ordinate system based on said three radial position indexes.

14. The apparatus of claim 13, wherein said scanning probe is a scanning probe microscope.

15. The apparatus of claim 14, wherein said scanning probe microscope is utilized to find areas of interest on said hard disk according to said rotational co-ordinate system.

16. The apparatus of claim 15, wherein said apparatus further includes a plurality of controlling stepper motors to position said scanning probe microscope relative to said magnetic pattern according to said rotational co-ordinate system.

17. A method for using a magnetically sensitive scanning probe to determine eccentricity between an essentially concentric magnetic track-oriented pattern disposed on a hard disk and a center of rotation of said hard disk, said method comprising:

positioning said scanning probe at a first point located on an outer track and marking said first point as a first radial position index;

positioning said scanning probe at a second point located on said outer track and marking said second point as a second radial position index;

positioning said scanning probe at a third point located on said outer track and marking said third point as a third radial position index;

calculating a magnetic center of rotation based on said three radial position indexes; and comparing said calculated magnetic center of rotation with said center of rotation of said magnetic hard disk to determine eccentricity between said calculated magnetic center of rotation and said center of rotation of said magnetic hard disk.

* * * * *